United States Patent [19]

Starzewski

[11] Patent Number: 5,770,316

[45] Date of Patent: *Jun. 23, 1998

[54] HEAT-STABLE POLARIZERS

[75] Inventor: Karl-Heinz Aleksander Ostoja Starzewski, Bad Vilbel, Germany

[73] Assignee: Bayer Aktiengesellschaft, Leverkusen, Germany

[*] Notice: The term of this patent shall not extend beyond the expiration date of Pat. No. 5,705,267.

[21] Appl. No.: 753,549

[22] Filed: Nov. 26, 1996

[30] Foreign Application Priority Data

Dec. 14, 1995 [DE] Germany .................. 195 46 747.7

[51] Int. Cl.⁶ .................................................. G02B 1/08
[52] U.S. Cl. ........................ 428/451; 359/485; 359/490; 359/491; 428/1; 428/448; 428/453
[58] Field of Search .................................... 359/485, 490, 359/491; 428/446, 448, 451, 453, 1

[56] References Cited

U.S. PATENT DOCUMENTS

| | | | |
|---|---|---|---|
| 3,914,017 | 10/1975 | Bedell et al. | 359/490 |
| 4,818,624 | 4/1989 | Downey, Jr. | 428/447 |
| 5,049,427 | 9/1991 | Starzewski et al. | 428/40.4 |

*Primary Examiner*—D. S. Nakarani
*Attorney, Agent, or Firm*—Sprung Kramer Schaeffer & Briscoe

[57] ABSTRACT

Heat-stable, flexible polarizers with a polarizing layer of a polymer with conjugated double bonds with the exception of exclusively polyacetylene-containing polymer matrixes are obtained if their surfaces are sealed with silicate.

10 Claims, No Drawings

HEAT-STABLE POLARIZERS

BACKGROUND OF THE INVENTION

The invention relates to heat-stable, flexible polarizers which comprise a polarizing layer of a polymer with conjugated double bonds, with the exception of exclusively polyacetylene-containing polymer matrices, having a surface sealed with silicate. The invention also relates to such polarizers which are additionally glued to covering layers.

U.S. Pat. No. 4 818 624 describes the stabilization of light polarizers by silylation of the surface with an organosilane. The action is inadequate, since bleaching and a shift in colour are already observed at 49° to 74° C. (120° to 165° F.) after 24 hours.

The production of laminates of various substrates with adhesive (glue) layers in between is known. U.S. Pat. No. 5 049 427 describes laminated polarizers which have a polarizing core layer of a polyacetylene (PAC)-containing polymer and transparent covering layers, the layers being glued by means of a special polyurethane-polyurea. Although such polarizers already show excellent properties, the stability under extreme conditions is not yet adequate. After storage at 90° C. for 500 hours, the polarizer has changed in its transmission with respect to non-polarized light, the change in transmission $\Delta T_{non-pol}$ being more than 5%.

However, use in optical displays which are exposed particularly severely to the action of heat (for example dashboards in cars) is only possible if the decrease in the optical properties $\Delta T_{non-pol}$ and $\Delta P$ of the polarizer is not more than 5% under these conditions, $\Delta P$ being the change in the degree of polarization. Constant optical properties of polarizers at 100° C. for 1000 hours have been described after gluing between glass plates. However, such composite systems are not very suitable for production of displays. Rather, flexible polarizers are desired, both in respect of the processing properties and in respect of flexible displays made of plastic.

SUMMARY OF THE INVENTION

The object of the invention was therefore to produce laminated polarizers based on a polymer with conjugated double bonds with the exception of exclusively polyacetylene-containing polymer matrixes which meet the above-mentioned conditions.

It has now been found, surprisingly, that this object can be achieved if the polarizer is sealed with a layer of silicate on its surface.

The invention also relates to a laminated, flexible polarizer of a polarizing core layer of a polymer with conjugated double bonds with the exception of exclusively polyacetylene-containing polymer matrixes and transparent flexible covering layers applied to both sides, characterized in that the core layer and covering layers are glued with a layer of silicate and the polarizer laminated in this way is flexible.

DETAILED DESCRIPTION OF THE INVENTION

The polarizer can also be used for joining to glass plates, optical lenses or prisms by means of the silicate layer. If the polarizer is glued to a glass display or another glass body with an organic adhesive on one side, it is sufficient to protect its free surface by silicate treatment.

The silicate layers are preferably applied to the core layer and/or the covering layers in the form of an aqueous solution. Suitable aqueous solutions of silicates are the known aqueous solutions of soda water-glass and potash water-glass.

Customary grades of water-glass have, in the case of soda water-glass, solids contents of 25 to 60% by weight and $SiO_2$ contents of 20 to 40% by weight; the remainder of the solids content is $Na_2O$; and in the case of potash water-glass, solids contents of 25 to 40% by weight and $SiO_2$ contents of 20 to 30% by weight; the remainder of the solids content is $K_2O$. To obtain even thinner silicate layers, these solutions can be further diluted with water.

The highest possible $SiO_2$ contents, i.e. those at which the weight ratio of $SiO_2/Na_2O \geq 3$ or $SiO_2/K_2O \geq 2.2$, are preferred.

By using the silicate layers, organic adhesives, such as are described in a large number in U.S. Pat. No. 5 049 427, are unnecessary.

The silicate layers already stabilize the properties of the polarizer in a layer thickness of $\leq 2$ μm. 100 mg to 2 g of water-glass (solid)/$m^2$ of surface to be glued are preferably required in order to achieve heat-stable gluing of the laminate.

In a preferred embodiment, the core layer and/or covering layer are subjected to treatment with a silane or with a borate before being coated with the silicate solution. This measure improves, in particular, the strength of the bond.

Suitable silanes correspond to the formula:

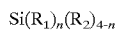

$$Si(R_1)_n(R_2)_{4-n}$$

wherein $R_1$ independently of one another denote halogen or alkoxy, $R_2$ independently of one another denote alkyl or alkenyl and n denotes the number 2, 3 or 4.

Alkyl and alkoxy radicals $R_1$ and $R_2$ can be substituted.

Suitable silanes are, for example, tetramethoxysilane, tetraethoxysilane, methyltri-methoxysilane, dimethyldimethoxysilane, ethyltriethoxysilane, dimethyldichlorosilane-silane, vinylmethyldichlorosilane, vinyltriethoxysilane. The silanes can also be mixed into the silicate solution directly, for example emulsified into it.

Suitable borates are, for example, boric acid and borax. The boric acid and borates can also be mixed into the water-glass solution directly or dissolved therein.

The silanes and borates are applied, in particular, by immersing the core layer and/or covering layer in a solution of the compound or, if the compound is liquid, in the pure compound and taking it out again. The amount taken up here is so low that it cannot be determined reliably by weighing, but is usually less than 1 g/$m^2$.

The covering layers have, for example, thicknesses of 5 μm to 1 mm, preferably 20 to 200 μm. The polarizing core layer has, for example, a thickness of 1 to 200 μm, preferably 5 to 50 μm.

Possible covering layers are, for example, aromatic polyesters, polyacrylonitriles, poly(meth)acrylates, poly sulfones, aromatic polycarbonates, cellulose acetates, cellulose acetobutyrates, cyclool elin/olefi n copolymers, in particular norbornenell-ethylene copolymers, polyamides, polyhydantoins, polyimides, polyamide-imides, polyparaphenylenebenzo-bis-imidazoles and -oxazoles and polyether-ketones, polyesters, poly(meth)acrylates, polycarbonates, cellulose esters and cycloolefinlol efin copolymers, in particular norbornene/ethylene copolymers, being preferred. The transparency of these materials is their most important feature. They are in general employed as films.

The polarizing core layer is a polarizer of polymers with conjugated double bonds with the exception of exclusively polyacetylene-containing polymer matrixes which have a maximum degree of polarization P of at least 90%, preferably at least 95%, particularly preferably at least 98%, and a maximum dichroic ratio $Q_E$ of 5 or more, preferably 10 or more, both based on the range of visible light. These polarizers are employed as films on which a preferred direction has been produced by stretching. The degree of stretching $\epsilon$, is more than 200%, preferably at least 400%, particularly preferably 500% to 1000%.

The degree of polarization P for linear polarized light and the degree of stretching $\epsilon$ are defined as follows:

$$P = \frac{\text{Transmission in the transparent position minus Transmission in the blocked position}}{\text{Transmission in the transparent position plus Transmission in the blocked position}} \times 100$$

$$\epsilon = \frac{l - l_o}{l_o} \cdot 100$$

($l$ = length after stretching; $l_o$ = length before stretching)

Polymers with conjugated double bonds for the polarizers according to the invention having surfaces sealed with silicate are known. Thus, for example, U.S. Pat. No. 3,914,017 describes at least partial dehydration of polyvinyl alcohol (PVA), conjugated double bonds (polyene sequences) within the PVA macromolecules being formed. The dehydration can be carried out purely thermally or by acid catalysis. The acid catalyzed dehydration can be initiated by treatment of the PVA film or PVA containing film with an acid like hydrochloric acid. The acid can be applied in aqueous or non-aqueous solution or in the gaseous phase. The film can be contacted with the acid before or after stretching. Elevated temperatures will then cause an accelerated formation of polyene sequences within the PVA backbone. The PVA to be dehydrated can furthermore be grafted with other vinyl monomers, such as (meth)acrylates, acrylonitrile, styrene, vinyl acetate or vinyl chloride. Conjugated double bonds can be produced in polymers in an analogous manner by splitting off HCl from polyvinyl chloride or by splitting off acetic acid from polyvinyl acetate.

Polymers containing conjugated double bonds which are exclusively prepared by polymerization of acetylene in another polymer (polymer matrix) in solution are excluded for the polarizers according to the invention. In polarizers of that kind the polyacetylene chains (polyacetylene chromophores) are grafted as side branches, e.g. on the PVA polymer matrix. However, such polyacetylenes in a polymer matrix in case that the polymer matrix is PVA, can be transformed in the manner described above, into thermostable extra broadband polarizers, which can be applied according to the invention, by an acid-catalyzed splitting-off of $H_2O$, whereby by the splitting-off of $H_2O$ polyene sequences are formed within the PVA backbone, in addition to the poklyacetylene branches grafted. In an analogous manner, instead of a splitting-off of $H_2O$, a splitting-off of HCl or of acetic acid can be carried out in case that the polymer matrix having grafted polyacetylene branches is polyvinyl chloride or polyvinyl acetate or contains the same.

The laminated polarizers according to the invention are distinguished by a number of outstanding properties:

1. a high transparency to light,
2. a high degree of light-fastness,
3. heat stability of the polarizing core layer,
4. excellent mechanical properties.

The polarizers according to the invention are suitable for all fields of use in which polarization films are used, in particular in optics (for example polarization microscopes, photography, antireflex treatment on sunglasses and ski glasses) and for displays, for example in clocks, pocket calculators, laptops, computers, indicators, projection displays, video games, camcorders and flat screen televisions.

At 80° C., even non-laminated polarizer films without stabilizers have a good stability, the changes in transmission ($\Delta T$) after 500 hours at 80° C. in air being 2–3%, and in the degree of polarization ($\Delta P$) being less than 1%.

In addition to the conjugated double bonds, the polarizer according to the invention can comprise additional dichroic substances, for example iodine or dichroic dyestuffs. However, the weight of conjugated double bonds makes up at least 50% by weight, preferably at least 80% by weight, of the total amount of dichroic substances.

EXAMPLES

Example 1

To prepare a polymer containing conjugated double bonds, according to U.S. Pat. No. 3,914,017, 26 g of ethyl acrylate and 29 g of methyl methacrylate are added to a solution of 55 g of polyvinyl alcohol in 600 ml of $H_2O$. The solution is rendered oxygen-free by bubbling through $N_2$ and then brought to a pH of 1.5 with concentrated $HNO_3$, and 6 g of $Ce(NH_4)_2(NO_3)_6$ in 15 ml of $H_2O$ were added. After the mixture had been stirred at room temperature for 3 hours, the monomers added had reacted. The resulting emulsion was dialyzed to a pH of 6.0 and then brought to a pH of 7.0 with a strongly basic ion exchanger. Optically clear films 50 to 100 $\mu$m thick were cast from the solution of the resulting graft polymer. These films were treated with anhydrous HCl gas at room temperature and then stretched at 90° C. for 3 minutes.

Example 2

Comparable films were obtained if treatment with concentrated hydrochloric acid at 60° C. was carried out instead of the treatment with anhydrous HCl gas as in Example 1.

Example 3

Comparable films were obtained if grafting was carried out with acrylonitrile instead of the grafting with ethyl acrylate methyl methacrylate as in Example 1.

Example 4

A POLPAC film stretched by 700% and having a layer thickness of 11 $\mu$m had a transmission T at 600 nm of 38.7% and a degree of polarization P of 99.99%. After 500 hours at 80° C., the transmission had risen to 41.7% and the degree of polarization had fallen only to 99.89%.

Example 5

The same film as in Example 4 was kept at 90° C. As a result, the transmission at 600 nm rose by 5.1% points after only 270 hours, the degree of polarization dropping by 1.84% points.

Example 6

The POLPAC film was dipped into an aqueous sodium silicate solution and then dried. The transmission T at 600 nm was 36.3% at a degree of polarization P of 99.95%. After 1446 hours at 90° C., the values were practically unchanged: T=6.6%, P=99.96%.

Example 7

A polyvinyl alcohol-polyacetylene film (A) having a polyacetylene content of 1.5% by weight was stretched by about 600%. The film had a thickness after stretching of 12 μm.

This film was laminated as follows:

Cellulose triacetate (CTA) films about 100 μm thick were coated on one side with soda water-glass. The polyvinyl alcohol-polyacetylene film described above was applied to one of these CTA films coated with soda water-glass onto the side coated with soda water-glass. A second cellulose triacetate film was applied to the free surface of the polyvinyl alcohol-polyacetylene film with its side coated with soda water-glass. The composite film was allowed to run through a rubber calander and was then hardened at 80° C. for 10 minutes.

Thereafter, the optometric data were determined in light of wavelength 600 nm: T=35.2%, P≧99.9%.

After storage at 90° C. for 500 hours, the values did not change. After storage at 160° C. for 16 hours, the following values were determined: T=35.1%, P≧99.9%.

Example 8

A POLPAC film was dipped for 5 minutes into a tetraethoxysilane/THF solution, which comprised 10% by weight of silane, dried and then glued between 2 CTA films 100 μ thick. For this, the POLPAC film was placed on one CTA film which was coated on one side with a sodium silicate solution. Thereafter, a second CTA film, also coated with sodium silicate solution, was placed with the moist silicate layer on the still unprotected POLPAC side, and the composite film was pressed together through the rubber rolls of a calander and dried at 95° C. for 5 minutes. The composite had a high strength, so that when separated with force, either the core layer broke up or the CTA film tore. The composite was so flexible that it could be bent backwards and forwards several times without breaking or losing its excellent heat stability.

The stability of the composite film was tested at 120° C. The transmission before the heat test, measured at 600 nm, was 36.6%, with a degree of polarization of 99.9%. After 1000 hours at 120° C. in air, T had fallen only to 36.1% and the degree of polarization was still 99.9%.

Example 9

A PVA film of 23 μm thickness was uniaxially drawn at 195° C. 7-fold (ε=600%). The thickness after stretching was 12 μm. This film was contacted during 5 minutes with HCl gas and after that heated for 15 minutes to 200° C. The resulting polarizing film had a maximum absorption at 550 μm. The transmission at this wavelength was 41% for unpolarized light, the degree of polarization 96.0%, and the dichroic ratio $Q_E$=19. The film was then treated with borax solution for crosslinking and with tetraethoxysilane and laminated with 2 CTA films using sodium silicate as described in example 8.

The composite film had excellent flexibility and heat stability at 90° C. during 1000 hours. The changes before and after heat treatment of ΔT and ΔP did not exceed 1%.

Example 10

A POLPAC film comparable to example 4 was treated with HCl gas during 3 minutes, and heated to 200° C. for 30 minutes which resulted in an extra broadband polarizer with degrees of polarization of ≧99% between 400 and 700 nm. Borate crosslinking, silanisation, and sodium silicate coating resulted in a high temperature stable polarizer with changes in ΔP and ΔT not exceeding 1% during 2000 hours at 90° C.

What is claimed is:

1. A heat-stable, flexible polarizer with a polarizing core layer of a polymer with conjugated double bonds, with the exception of exclusively polyacetylene-containing polymer matrixes, wherein the polarizing core layer has surfaces sealed with soda water-glass or potash water-glass.

2. The polarizer of claim 1, wherein sealing of the surface is carried out with a solution of soda water-glass or potash water-glass.

3. The polarizer of claim 2, wherein sealing of the surface is carried out with 100 mg to 2 g of soda or potash water-glass (solid)/m² of surface to be sealed.

4. The polarizer of claim 2, wherein a silane and/or a borate is admixed with the solution of soda water-glass or potash water-glass.

5. The polarizer of claim 1, wherein transparent flexible covering layers are applied to both sides of the polarizing core layer and are adhered to the polarizing core layer by the layers of soda water-glass or potash water-glass.

6. The polarizer of claim 5, wherein the polarizing core layer and/or the covering layers are subjected to treatment with a silane or with a borate before sealing with soda water-glass or potash water-glass.

7. The polarizer of claim 6, wherein the silane corresponds to the formula:

$$Si(R_1)_n(R_2)_{4-n}$$

wherein $R_1$ independently of one another denote halogen or alkoxy, $R_2$ independently of one another denote alkyl or alkenyl and n denotes the number 2, 3 or 4.

8. The polarizer of claim 1, wherein the polymer is an at least partly dehydrated polyvinyl alcohol.

9. The polarizer of claim 1, wherein the polarizing core layer comprises additional dichroic substances.

10. The polarizer of claim 1, wherein the polymer has, in addition to the conjugated double bonds, polyacetylene chromophores as grafted side chains which are obtained by polymerisation of acetylene.

* * * * *